United States Patent Office 3,781,446
Patented Dec. 25, 1973

3,781,446
CARBAMYLOXYBENZYLIDENEMALONONITRILE INSECTICIDES
Roger P. Cahoy and John Sanjean, Overland Park, Kans., assignors to Gulf Research & Development Company, Pittsburgh, Pa.
No Drawing. Original application Sept. 8, 1970, Ser. No. 70,529, now Patent No. 3,694,483. Divided and this application May 11, 1972, Ser. No. 252,205
Int. Cl. A01n 9/20
U.S. Cl. 424—300
5 Claims

ABSTRACT OF THE DISCLOSURE

The carbamyl derivatives of 4-hydroxy-3,5-di-tert.butyl benzylidenemalononitrile are compounds which possess a high order of activity as miticides, insecticides and fungicides. New compounds of this class, for example, 3,5-di-tert.butyl - 4 - (3-bromophenylcarbamyloxy)benzylidene-malononitrile, are particularly effective against corn rootworm while possessing less toxicity to warm blooded animals than the most closely related prior art compound.

---

This is a division of U.S. patent application Ser. No. 70,529, filed Sept. 8, 1970, now U.S. Pat. 3,694,483.

DESCRIPTION OF INVENTION

It has been recently discovered that certain benzylidene-malononitrile compounds are highly toxic to many different species of living organisms. One of these compounds, 3,5 - di-tert.butyl-4-hydroxybenzylidenemalononitrile has recently been found to be effective as acaricide, insecticide and fungicide. This compound and its method of synthesis are both reported in Ann., vol. 645 pp. 53–65 (1961). This compound unfortunately possesses the same disadvantage as many other highly effective insecticides; that is, a high level of toxicity to warm blooded animals, including humans. It has now been discovered that carbamyl derivatives of this compound having considerably higher molecular weights, which would therefore appear to dilute the toxic structure on a weight basis, possess both the advantages of high toxicity to insects and mites and greatly reduced toxicity to warm blooded animals. The method of preparation of these compounds is illustrated in the procedures which appear below.

Preparation of 3,5-di-tert.butyl-4-(phenylcarbamyloxy)-benzylidenemalononitrile

A stirred reaction flask was charged with 7.0 g. (0.025 mole) of 3,5-di-tert.butyl-4-hydroxybenzylidenemalononitrile, 100 ml. acetonitrile, 3.2 g. (0.027 mole) of phenyl isocyanate and a catalytic quantity of 1,4-diazobicyclo [2.2.2] octane. The reaction solution was heated at 60–65° for 15 hours. A small quantity of insoluble material was removed from the reaction solution by gravity filtration. The solvent was removed on a rotary evaporator and the residue was stirred with hexane. The material which crystallized was collected on a vacuum filter. The compound was crystallized from benzene hexane and melted at 135–38° C.

Analysis.—Calcd. for $C_{25}H_{27}N_3O_2$ (percent): C, 74.79; H, 6.78; N, 10.47. Found (percent): C, 75.02; H, 6.71; N, 10.36.

3,5 - di-tert.butyl-4-(4-chloro-3-methylphenylcarbamyl-oxy)benzylidenemalononitrile was, likewise, prepared as described above. This compound melted at 139–41° C.

Analysis.—Calcd. for $C_{26}H_{28}ClN_2O_2$ (percent): C, 69.40; H, 6.27; N, 9.34. Found (percent): C, 68.90; H, 6.21; N, 9.37.

Preparation of 3,5-di-tert.butyl-4-(3-bromophenylcar-bamyloxy)benzylidenemalononitrile A reaction flask was charged with 7.0 g. (0.025 mole) of 3,5 - di-tert.butyl-4-hydroxybenzylidenemalononitrile, 6.1 g. (0.32 mole) 3-bromophenyl isocyanate, 1.5 ml. heptane and one drop of triethylamine. The reactants were mixed by hand stirring and heated on a water bath at 50–55° C. Within several minutes, an exothermic reaction took place and the reaction temperature reached 70° C. The reaction mixture was cooled, dissolved in benzene and gravity filtered. Hexane was added to the filtrate and the precipitated oil crystallized when cooled. The material which crystallized was collected on a vacuum filter. The compound was stirred in 200 ml. of heptane, collected and air dried. It melted at 146–48° C.

Analysis.—Calcd. for $C_{25}H_{26}BrN_3O_2$ (percent): C, 62.50; H, 5.46; N, 8.75. Found (percent): C, 61.87; H, 5.54; N, 8.68.

3,5 - di - tert.butyl - 4 - (3 - chloro - 4 - methoxyphenyl-carbamyloxy) benzylidenemalononitrile was, likewise, prepared as described above. This compound melted at 159–65° C.

Analysis.—Calcd. for $C_{26}H_{28}ClN_3O_3$ (percent): C, 67.02; H, 6.06; N, 9.02. Found (percent): C, 66.30; H, 6.11; N, 9.20.

Preparation of 3,5-di-tert.butyl-4-(2-methylphenyl-carbamoyloxy)benzylidenemalononitrile A stirred reaction flask was charged with 14.1 g. (0.05 mole) of 3,5-di-tert.butyl-4-hydroxybenzylidenemalononi-trile and excess (25 ml.) 2-methylphenyl isocyanate. The reaction was mildly exothermic and became thick after 30 minutes. In order to facilitate stirring, 50 ml. of heptane was added. The reaction mixture was allowed to stir for an additional 14 hours at room temperature. The solid was collected and the filter cake was washed with heptane. After air drying, the 19.6 g. sample melted at 168–72° C. The material was twice crystallized from benzene and melted at 197–200° C.

Analysis.—Calcd. for $C_{26}H_{29}N_3O_2$ (percent): C, 75.15; H, 7.03; N, 10.11. Found (percent): C, 75.75; H, 7.02; N, 9.79.

The illustrative procedures for testing the compounds as miticides and insecticides are described below.

INSECTICIDE AND MITICIDE TESTING PROCEDURES

Method for mites, aphids, bean beetles and army worms

Three 5 oz. paper cups containing Henderson dwarf lima bean plants and one 5 oz. paper cup containing Orange Gem nasturtiums, all growing in vermiculite, are placed on a turntable and sprayed to thorough wetness with 25 ml. of a solution of the candidate chemical at the appropriate concentration. Nasturtiums were already infested with 50–100 bean aphids (BA). A bean plant in one paper cup was already infested with 50–100 two-spotted mites (TSM). Leaves from the two remaining bean plants are removed following spraying and placed in disposable petri dishes with 5 southern armyworm (SA) larvae in one petri dish, and 5 Mexican bean beetle (MBB) larvae in the other petri dish. The rating is done approximately 48 hours after spraying as follows.

BA:
- E=none dead
- D=1–25% dead
- C=26–50% dead
- B=51–75% dead
- A=76–100% dead TSM:[1]
- E=no dead adults
- D=1–25% dead adults
- C=26–50% dead adults
- B=51–75% dead adults
- A=76–100% dead adults MBB:
- E=0–1 larvae dead
- D=2 larvae dead
- C=3 larvae dead
- B=4 larvae dead
- A=5 larvae dead SA:
- E=0–1 larvae dead
- D=2 larvae dead
- C=3 larvae dead
- B=4 larvae dead
- A=5 larvae dead

[1] Data reported here for TSM are based on 7 days after spraying.

Method for southern corn rootworm (SCR)

Three 5 oz. paper cups planted each with one kernel of DeKalb XL–361 corn are treated two days after planting with 10 ml. of a 125 p.p.m. solution of the candidate compound. Promising compounds are tested at lower concentrations. The experiment is a 4 x 5 factorial in a randomized complete block design with three replications. The tests are evaluated nine days after treatment. The roots are inspected under a dissecting microscope and rated as follows.

| SCR rating: | Percent root feeding damage |
|---|---|
| A | 0 |
| B | 1–25 |
| C | 26–50 |
| D | 51–75 |
| E | 76–100 |

So as to obtain more meaningful results, all tests were performed at the same time of day, whenever possible, usually in the forenoon. All tests were held under controlled conditions of temperature, light and humidity. Atmospheric pressure was not controlled.

Test results obtained at various concentrations of active chemical are tabulated below. The ratings given are for averages of three or more replicates. The oral lethal dose for 50 percent kill of laboratory rats is also recorded in the table. In conducting the toxicity test on rats, 0.01 g. of active chemical per ml. in corn oil was employed as an additive to the diet of the animals.

RATINGS OF COMPOUNDS ON MITES AND INSECTS

| Compound | Concn. (p.p.m.) | Mites (TSM) | Southern armyworm (SA) | Mexican bean beetle (MBB) | Southern corn rootworm (SCR) | LD$_{50}$ (oral), mg./kg., body wt. |
|---|---|---|---|---|---|---|
| (a) Commercial standards: | | | | | | |
| Kelthane * | 500 | A | | | | |
|  | 250 | A | | | | |
| Dicofol | 125 | A–B | | | | 684 |
|  | 62 | B | | | | |
|  | 31 | C–D | | | | |
|  | 15 | E | | | | |
| Sevin [1] | 500 | | A | | | |
|  | 250 | | A | | | |
| Carbaryl | 125 | | A | | | |
|  | 62 | | A | | | 540 |
|  | 31 | | A | | | |
|  | 15 | | A | | | |
| Dursban [1] | 500 | | | A | | |
|  | 250 | | | A | | |
|  | 125 | | | A | | 135 |
|  | 62 | | | A | | |
|  | 31 | | | A | | |
|  | 15 | | | A | | |
| Bux 2E | 15.6 | | | | A | 1,050 |
| (b) New insecticides: | | | | | | |
| Compound 1: 4-chloro-2-methoxyphenyl carbamate of 3,5-di-tert-butyl-4-(2,2-dicyano-vinyl)phenol | 500 | | | | | |
|  | 250 | AB | A | E | | |
|  | 125 | C | A | E | A | |
|  | 62 | C | A | E | A | |
|  | 31 | D | E | E | A | |
|  | 15 | E | E | E | A | |
| Compound 2: 4-chloro-2-methylphenyl carbamate of 3,5-di-tert-butyl-4-(2,2-dicyanovinyl)phenol | 500 | | | | | |
|  | 250 | A | A | A | | |
|  | 125 | B | A | E | A | |
|  | 62 | C | B | E | A | |
|  | 31 | D | E | E | A | |
|  | 15 | | E | E | A | |
| Compound 3: 2-methylphenyl carbamate of 3,5-di-tert-butyl-4-(2,2-dicyanovinyl)phenol | 500 | | | | | |
|  | 250 | C | A | | A | |
|  | 125 | C | B | | A | |
|  | 62 | D | E | | A | 205–389 |
|  | 31 | E | E | | A | |
|  | 15 | E | E | | A | |
| Compound 4: 2-bromophenyl carbamate of 3,5-di-tert-butyl-4-(2,2-dicyanovinyl)phenol | 500 | | | | | |
|  | 250 | B | A | A | | |
|  | 125 | C | A | E | A | |
|  | 62 | D | A | E | A | |
|  | 31 | E | E | E | A | |
|  | 15 | E | E | E | A | |

TABLE—Continued

| Compound | Concn. (p.p.m.) | Mites (TSM) | Southern armyworm (SA) | Mexican bean beetle (MBB) | Southern corn rootworm (SCR) | LD$_{50}$ (oral), mg./kg., body wt. |
|---|---|---|---|---|---|---|
| (CH$_3$)$_3$C–, HO–⟨phenyl⟩–C(H)=C(C≡N)$_2$, (CH$_3$)$_3$C– | 500<br>250<br>125<br>62<br>31<br>15 | A<br>A<br>A<br>A<br>C<br>D | A<br>A<br>A<br>A<br>D<br>E | A<br>B<br>C<br>C<br>E<br>E | <br><br>A<br>A<br>A<br>A | <br><br><br>28<br>6.5–<br> |
| ⟨phenyl⟩–NH–C(O)–O–⟨(CH$_3$)$_3$C, (CH$_3$)$_3$C phenyl⟩–CH=C(C≡N)$_2$ | 500<br>250<br>125<br>62<br>31<br>15 | <br>A<br>BC<br>CD<br>DE<br>E | A<br>A<br>B<br>E<br>E<br>E | A<br>A<br>D<br>D<br>E<br>E | <br><br>D<br>A<br>AB<br>E | <br><br>25.7–48.7<br><br><br> |

[1] Trade name.

As indicated by the tabulated data, the novel compounds of this invention possess high toxicity to southern corn rootworm while having substantially lower toxicity to warm-blooded animals. This greatly reduces the hazards involved in handling these compounds and makes it feasible to use higher concentrations in corn fields without substantial hazard to domestic animals and wildlife. In the typical method of use, the insecticides are formulated either as dry granules or liquid spray mixtures according to conventional techniques and are applied at planting time, with a second application, if desired, at the same time as cultivation between the corn rows.

We claim:

1. A method of combating southern corn rootworm comprising applying to the locus of the corn roots an insecticidally effective amount of 3,5-di-tert.butyl-4-(4-chloro - 3 - methylphenylcarbamyloxy)benzylidenemalononitrile.

2. A method of combating southern corn rootworm comprising applying to the locus of the corn roots an insecticidally effective amount of 3,5-di-tert.-butyl-4-(3-chloro - 4 - methoxyphenylcarbamyloxy)benzylidenemalononitrile.

3. A method of combating southern corn rootworm comprising applying to the locus of the corn roots an insecticidally effective amount of 3,5-di-tert.butyl-4-(3-bromophenylcarbamyloxy)benzylidenemalononitrile.

4. A method of combating southern corn rootworm comprising applying to the locus of the corn roots an insecticidally effective amount of 3,5-di-tert.butyl-4-(2-methylphenylcarbamyloxy)benzylidenemalononitrile.

5. A method of combating southern corn rootworm comprising applying to the locus of the corn roots an insecticidally effective amount of 3,5-di-tert.butyl-4-(phenylcarbamyloxy)benzylidenemalononitrile.

References Cited

UNITED STATES PATENTS 3,527,785  9/1970  Ozaki et al. _____ 260—465
3,694,483  9/1972  Cahoy et al. _____ 260—465

OTHER REFERENCES

Chemical Abstracts, vol. 70 (1969), p. 257.

ALBERT T. MEYERS, Primary Examiner
V. D. TURNER, Assistant Examiner